United States Patent

[11] 3,545,677

| [72] | Inventors | Bernard A. Power<br>255 Touzin Ave.;<br>Robert F. Power, 510 Lakeshore Drive, Apt. 19, Dorval, Quebec, Canada |
|---|---|---|
| [21] | Appl. No. | 726,476 |
| [22] | Filed | May 3, 1968 |
| [45] | Patented | Dec. 8, 1970 |

[54] METHOD OF CLOUD SEEDING
9 Claims, 3 Drawing Figs.

[52] U.S. Cl. .................................................. 239/2, 239/14, 239/338
[51] Int. Cl. .................................................. A01g 15/00
[50] Field of Search .................................. 239/2, 14, 338, 346

[56] References Cited
UNITED STATES PATENTS

| 2,847,248 | 8/1958 | Schmitt et al. | 239/338 |
| 2,527,230 | 10/1950 | Schaefer et al. | 239/2 |
| 2,527,231 | 10/1950 | Vonnegut | 239/2X |
| 2,819,716 | 1/1958 | Miller | 239/338X |
| 2,908,442 | 10/1959 | Stone | 239/2 |

OTHER REFERENCES

United States Department of Commerce Weather Bureau, Washington D.C. Revised August, 1954 " Cloud Seeding Methods" Class 239 Sub 14

Primary Examiner—M. Henson Wood, Jr.
Assistant Examiner—JOhn J. Love
Attorney—Alan Swabey ABSTRACT: A precipitation-amenable atmosphere is seeded with an aerosol of an aqueous solution of silver iodide and a substance effective to solubilize silver iodide. The aerosol forms fine particles in the atmosphere which act as nuclei to cause precipitation.

PATENTED DEC 8 1970
3,545,677
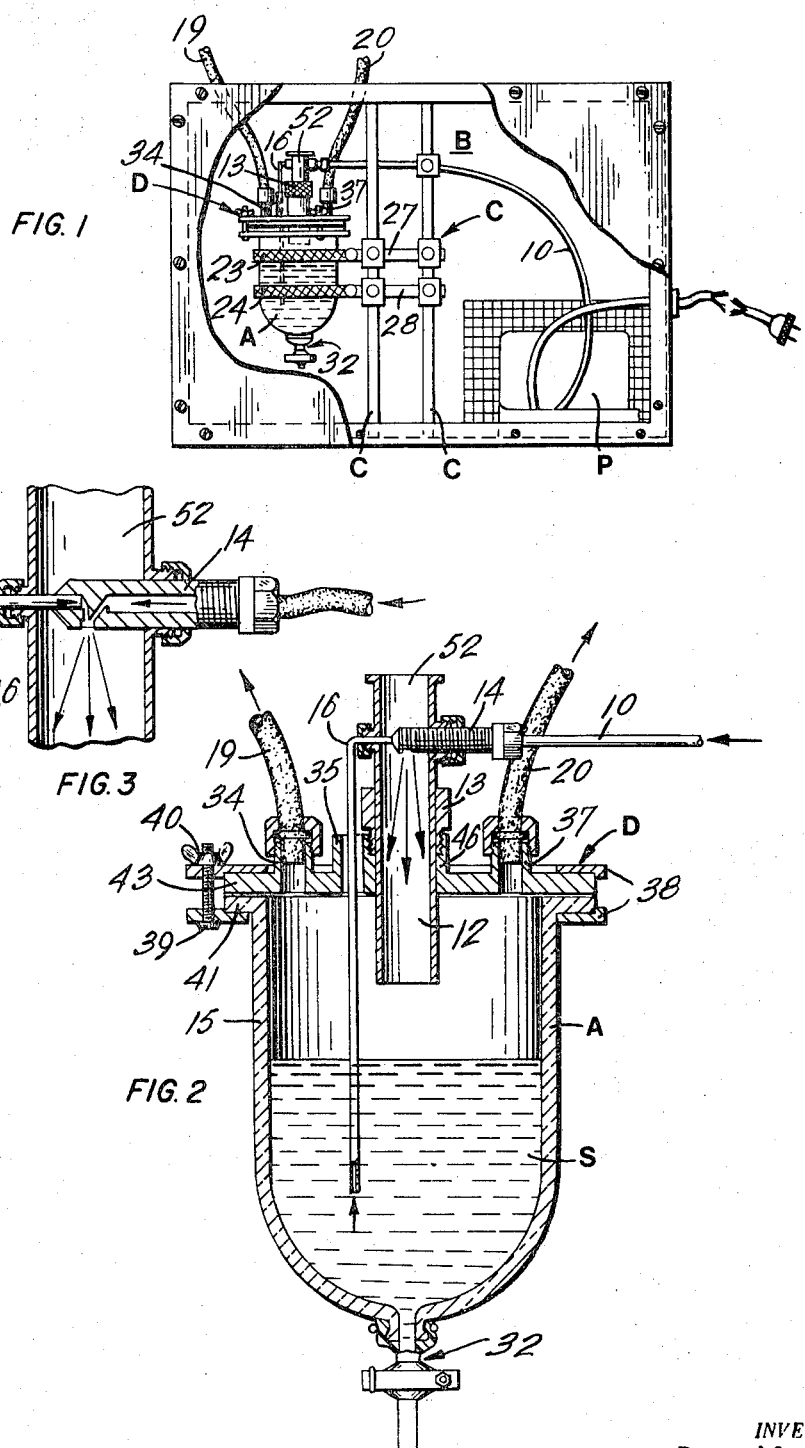
INVENTORS
Bernard A. POWER
Robert F. POWER
ATTORNEY

METHOD OF CLOUD SEEDING

This invention relates to seeding clouds.

Conventionally, clouds are seeded by dispersing in them ice-nucleating crystals of silver iodide. This has been done either by a combustion process of vaporizing silver iodide at a high temperature and causing it to recrystallize or by spraying into the atmosphere a solution of silver iodide in ammonia or by burning a solution of silver iodide in acetone. In the former process a combustible has to be burned. In the latter two cases, inflammable, toxic, or corrosive solutions must be handled.

These disadvantages are avoided and positive advantages attained by the present invention. According to the invention, an aqueous solution of silver iodide and a substance effective to maintain the silver iodide in solution is atomized and distributed into a precipitation-amenable atmosphere to form fine droplets which act as nuclei for precipitation. The solubilizing substance is preferably a cosolute of which water soluble iodides are preferred including sodium iodide, potassium iodide, or ammonium iodide, or which can be sodium chloride. The solution should be less then saturated at operating temperature and it is desirable to operate within the range from about 30 percent to about 92 percent saturation, with from about 80 percent to about 90 percent saturation preferred. The actual concentrations of the silver iodide and the substance effective to maintain it in solution will vary depending upon the operating temperature. The applicants prefer to operate with the temperature of the solution at the surrounding temperature, for example, of an aircraft compartment, from which the operations are carried out. Under certain conditions, however, heating or cooling of the solution may be desirable.

Normally the solution will remain stable. But, in the event that traces of moisture enter the system and cause the silver iodide precipitate, this precipitate will usually redissolve quickly, for example, in a matter of seconds. In aircraft operations there is normally a slight motion which serves to agitate the solution and inhibit the retention of any precipitate. If desired, positive agitation may be employed of the vessel or within the vessel holding the solution.

The invention has generally been described and will now be referred to more specifically by reference to the accompanying drawings, which illustrate a preferred embodiment, and in which:

FIG. 1 is a general arrangement shown mainly in elevation of an embodiment of the invention, with the housing partly cut away to show the working apparatus;

FIG. 2 is an enlarged fragmentary vertical cross section, partly in elevation, through a reaction kettle and its various components and connections; and FIG. 3 is a further enlarged fragmentary cross section showing the atomizer employed in this particular arrangement.

Referring more particularly to the drawings, a reaction kettle A is mounted from a frame C within a casing B on arms 27 and 28 terminating in chain clamps 23 and 24 respectively which encircle the kettle A. The casing B is usually in the compartment of an aircraft.

Referring more particularly to FIG. 2, the kettle A is made up of a vessel 15 which contains a solution S of silver iodide and a solution effective to maintain it in solution and which is provided with a drainage stop cock 32 at its bottom and a cover. At the top the body of the flask is surrounded by an annular lip or flange 41 which receives juxtaposed to it the annular lip or flange 43 of a cover indicated generally by D. The flanges 41 and 43 are clamped together by reaction kettle clamps 38 acted on by screws 39 and wing nuts 40.

The top D is provided with opening necks 34 and 35 and 46 and 37. A metal tube 52 is fitted into a central neck 46 and is surrounded by a collar 13 which retains the tube 52 protruding to a predetermined position into the kettle A. Flexible tubes 19 and 20 extend from the necks 34 and 37 and lead out from the top D to a position where they can distribute solution, coming from the flask A, into the atmosphere.

The top of the tube 52 is open and is subject to normal atmospheric pressure. Projecting partly into the tube 52 and extending partly outside the tube 52 is an atomizer 14. An example of a suitable atomizing apparatus 14, shown in the drawings, is the "De Vilbiss No. 841 Nebulizer" as sold by the De Vilbiss Company, Somerset, Pennsylvania. Other nebulizing means may be used. A flexible tube 10 leads from a blower P to the atomizer. A tube 16 leads from within the solution in the vessel A to the intake end of the atomizer 14 through the neck 35.

In operation, a stable aqueous solution is prepared in the flask A by forming an aqueous solution of a water soluble sodium iodide, then adding to the solution silver iodide in an amount less than effective to saturate the solution.

Then, the blower P is set into operation feeding air under forced draft through the atomizer 14 so as to draw fluid through the fluid tube 16 from the vessel A and atomizes it in the jet assembly into the form of a jet which emanates as an aerosol of droplets down the tube 52. This aerosol migrates from the top of the vessel A in a space above the liquid through the dispersing tubes 19 and 20 and thence into the atmosphere. Where the atmosphere is moisture-containing and at least minus four degrees centigrade (−4° C.), precipitation is caused.

If condensation takes place on the droplets as they are dispersed into the atmosphere, dilution will cause precipitation of the silver iodide. Then, if ambient temperature is below a certain value, minus four degrees centigrade, it will freeze and form a nucleus for precipitation.

If evaporation takes place from the aerosol, before freezing has taken place, the precipitated silver iodide will go back into solution. It will then be ready to act as a precipitating agent when more moisture condensed on it and the silver iodide again precipitated. Various phase transformations of this type are possible. The end result in all cases, however, is the precipitation of the silver iodide and the freezing of water to cause an ice nucleus. In addition to phase transformations of the silver iodide, a double salt of silver iodide and the soluble iodide may be formed and phase transformations of the double salt may also result.

Examples of solubilizing agents for the silver iodide are cosolutes, for instance, water soluble iodides, for example, sodium iodide, potassium iodide, or ammonium iodide, or sodium chloride.

A typical preferred saturated solution is in the proportions of water 100 cubic centimeters, sodium iodide (50 percent in water by volume) 50 cubic centimeters and silver iodide 14.5 grams.

Examples of other proportions of sodium iodide, potassium iodide, and silver iodide that can be used to make up these seeding solutions are as follows.

Sodium Iodide - Silver Iodide - Water

Temp. 25° C.
Grams per 100 grams of water

| Sodium iodide (NaI): | Silver iodide (AgI) |
|---|---|
| 59.29 | 21. 21 |
| 67.47 | 28. 52 |
| 134.1 | 99. 54 |
| 156.9 | 124. 6 |

Potassium Iodide - Silver Iodide - Water

Temp. 15° C.
Grams per 100 grams of Saturated Solution

| Potassium iodide (KI): | Silver iodide (AgI) |
|---|---|
| 59.16 | 53. 15 |
| 57.15 | 40. 0 |
| 50.0 | 25. 0 |
| 40.0 | 13. 0 |
| 33.3 | 7. 33 |
| 25.0 | 2. 75 |
| 21.74 | 15. 76 |
| 20.0 | 0. 80 |

As for sodium chloride a solution of 26.31 grams of NaCl in 100 grams of aqueous solution will dissolve 0.0244 grams of silver iodide at 15° C.

The critical concentration is that (at a given temperature) above which concentration the silver iodide will not dissolve. This is a function of both the amount of the cosolute and of the amount of silver iodide, i.e. for a saturated solution of a water soluble iodide there is a fixed amount of silver iodide that can be used which can readily be determined.

It is preferable to stay below the critical amount of silver iodide, since, if condensation takes place, either into the solution or in the vaporizing nozzle, a precipitate of the silver iodide tends to form and could clog the solution nozzle. The applicants prefer for reasons of silver iodide output to stay at least 10 percent undersaturated on the silver iodide side and at least 10 percent undersaturated on the water soluble iodide side.

Wetting agents or surface active substances which would effect the surface tension of the solution can be present in it and have an effect on the type of aerosol produced. Other agents which can assist in the nebulization or act as a prevention of clogging in the nozzle or which will alter the size distribution of the aerosol produced can also be used.

The preferred temperature of operation is room temperature where the apparatus is operated, as preferred, inside a heated compartment of an aircraft. The applicants, therefore, prefer to calculate their solutions between working temperatures of 10° C. to 20° C. If an unheated compartment should be used the strength of the water-soluble solution that could be used would be reduced and therefore the amount of silver iodide would also be reduced. This would not prevent carrying out the invention, but it would reduce the rate output of silver iodide nuclei.

The aerosol can be dispersed either from the ground or from an aircraft. The dispersing port may be located anywhere on the aircraft, provided a positive exit pressure is maintained. A preferred position is at the tail of the aircraft.

A preferred method and apparatus for atomizing the solution has been illustrated. Alternatively, atomization may be done through a spinning disk type of atomization, through electrical atomization or otherwise.

The following are examples of ways in which the solution can be used to produce an aerosol of silver iodide droplets. Air blast or aerodynamical atomization of the liquid by using compressed air to break up the liquid as it issues from a nozzle. Centrifugal action by using liquid thrown off a spinning disk, a spinning cone or a spinning top to produce a break up of the liquid into particles. Hydraulic or hydrodynamic atomization by which the fluid is forced through a nozzle and breaks up on emergence from the nozzle. Electrostatic atomization where the liquid is forced through a nozzle and subjected to high electrostatic potential which gives effective atomization. Acoustical atomization where the liquid is atomized by the influence of sound waves or ultrasonic vibrations.

In all cases a change of the pressure under which the fluid is forced through the nozzle or into the air blast, etc. will affect the size of distribution of the aerosol produced. Once the aerosol is produced, a selection can be made of the size of the droplets that are allowed to escape by the use of baffles of various types and also by multiplication of the number of baffles. The greater number of baffles the finer the aerosol droplets emitted.

The apparatus may employ solutions of other nucleating agents than silver iodide.

We claim:

1. A method of cloud seeding comprising, distributing into a cold precipitation-amenable atmosphere an aqueous aerosol of a solution containing silver iodide and a substance effective to solubilize silver iodide, said solution being from 30 percent to 92 percent saturated at an operating temperature in silver iodide, 2. A method, as defined in claim 1, in which the solubilizing substance is a cosolute with the silver iodide.

3. A method, as defined in claim 2, in which the cosolute is selected from the group consisting of water soluble iodides and sodium chloride.

4. A method, as defined in claim 3, in which the cosolute is sodium iodide.

5. A method, as defined in claim 3, in which the cosolute is potassium iodide.

6. A method, as defined in claim 3, in which the cosolute is ammonium iodide.

7. A method, as defined in claim 3, in which the cosolute is sodium chloride.

8. A method, as defined in claim 3, in which the solution is from 80 percent to about 90 percent saturated at the operating temperature in silver iodide.

9. A method, as defined in claim 3, in which the operating solution temperature is from about 5° C. to about 25° C.